Feb. 7, 1961

M. PIET ET AL 2,971,090

SOLENOID OPERATED HIGH PRESSURE VALVE
HAVING MINIMUM CLOSURE TRAVEL

Filed May 16, 1955

MEYER PIET
RODERICK J. KOUTNIK
INVENTORS.

BY

Attorney

Feb. 7, 1961    M. PIET ET AL    2,971,090
SOLENOID OPERATED HIGH PRESSURE VALVE
HAVING MINIMUM CLOSURE TRAVEL
Filed May 16, 1955    3 Sheets-Sheet 2

MEYER PIET
RODERICK J. KOUTNIK
INVENTORS.

BY
Attorney

United States Patent Office 2,971,090
Patented Feb. 7, 1961

2,971,090

SOLENOID OPERATED HIGH PRESSURE VALVE HAVING MINIMUM CLOSURE TRAVEL

Meyer Piet, Arcadia, and Roderick J. Koutnik, Vista, Calif., assignors to Futurecraft Corporation, El Monte, Calif., a corporation of California Filed May 16, 1955, Ser. No. 508,444

17 Claims. (Cl. 137—620)

This invention relates to valves for controlling the flow of fluids under high pressure, and relates in particular to valves adapted to be operated by relatively small solenoids because of the relatively small force required for the operation of the valves as compared to the force required to operate the valves of the prior art capable of handling fluids at high pressures. For example, a representative valve, according to the present invention, is of one-quarter inch tube size and capable of operating at three thousand pounds per square inch, at temperatures ranging from minus 65 degrees F. to plus 250 degrees F. has a weight of 1.1 lbs.

The present invention is of a special utility in aircraft and missiles, wherein weight reduction is of great importance. An object of the invention is to provide for a simplification of the cooperating parts of the valve device and to provide a valve of poppet type utilizing for sealing purposes resilient rings such as O rings of rubbery compound. Herein the term "rubbery" is employed to mean rubber and synthetic compounds having the general characteristics of natural rubber.

It is a further object of the invention to provide a high pressure valve having port and closure parts so formed in cooperative relation that an effective seal will be formed and so that relatively small movement of the slide or stem part of the valve will be required to operate the valve into its open condition.

It is a further object of the invention to provide a valve of this character having an inlet or pressure passage and cooperating port and closure members, one of which is an annular shoulder and the other of which comprises a resilient ring arranged so that a small annular portion of the resilient ring lies in radially overlapping relation to the annular shoulder, there being stop means for stopping the slide or stem part of the valve in a position wherein the resilient ring and the annular shoulder engage, thereby preventing flow of fluid through the port opening, these parts being arranged so that an increase in fluid pressure effects a corresponding increase in the pressure of the annular portion of the resilient ring against the rigid shoulder so that leakage of fluid between the resilient ring and the annular shoulder is positively prevented.

A further object of the invention is to provide a valve device of the character set forth in the preceding paragraph wherein the resilient ring is supported by annular means having a flange positioned between the resilient ring and the shoulder, this flange being tapered to a thin annular edge lying close to the annular shoulder when the valve is in closed condition.

This thin edge of the flange is shifted axially away from the annular shoulder, by relatively small movement of the slide part of the valve, to provide an ample port opening.

It is also an object of the invention to provide a simple, lightweight valve, capable of operation under high fluid pressures and having a pressure passage for connection to the source of fluid pressure, a service passage for connection to the device which is to be operated by fluid pressure, and a vent passage through which the fluid utilized in the device may be vented. It is also an object of the invention to provide a pilot-operated valve embodying the features of the present invention.

Further objects and advantages of the invention may be brought out in the following part of the specification wherein small details have been described for the purpose of competence of disclosure, without intending to limit the scope of the invention which is set forth in the appended claims. Referring to the accompanying drawings which are for illustrative purposes only:

Figures 1, 2, 3, 4:
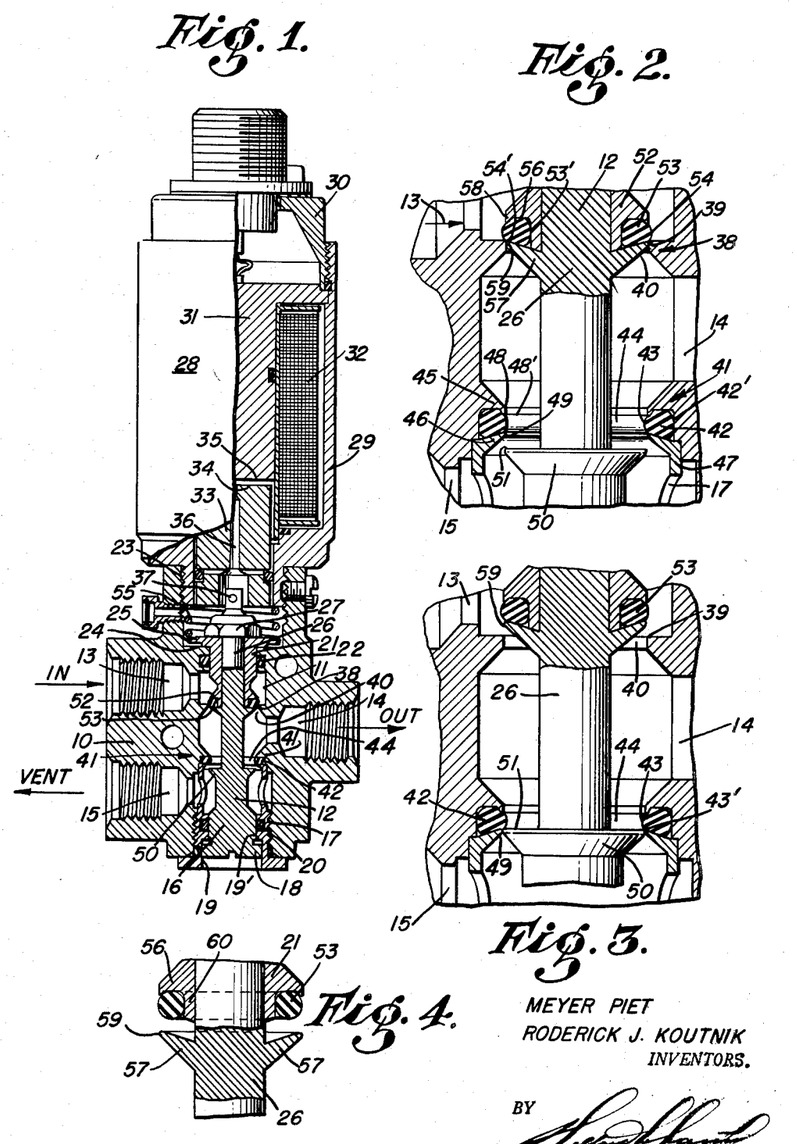
Fig. 1 is a partly sectioned view of a preferred form of the invention.
Fig. 2 is an enlarged fragmentary sectional view showing the pressure port of the valve closed and with the vent port thereof in open communication with the service passage of the valve.
Fig. 3 is an enlarged fragmentary sectional view, similar to Fig. 2, showing the pressure port in open communication with the service passage of the valve, and with the vent port closed.
Fig. 4 is a fragmentary sectional view showing a resilient ring prior to its deformation radially by application of axial compression.

The form of the invention shown in Figs. 1, 2 and 3 includes a valve body 10 having an axial opening 11 in which a valve item or slide member 12 is operative. The valve body 10 has laterally directed inlet or pressure passage 13, outlet or service passage 14 and vent passage 15 spaced along the axis of the opening 11 of the body 10, and in communication therewith. These passages 13, 14 and 15 are formed by walls which are threaded, as shown, for connection to piping or conduit.

The slide member 12 is of round cross section. At its lower end it has an integrally formed body 16 which is slidable within a sleeve 17 which is threaded into the lower end of the body opening 11. Below the cylindrical body 16 of the slide member 12 there is a flange 18 which is received in a counterbore 19 in the lower end of the sleeve 17. The sleeve 17 is internally grooved to receive an O-ring 20 adapted to form a seal around the body 16.

The slide member 12 has at its opposite end a separate cylindrical body 21 which is slidable in an O-ring 22 carried by the body 10 in a position above the pressure passage 13. The body 10 has at its upper end an internally threaded counterbore, there being a radial annular shoulder or stop 24 at the lower end of the counterbore 23 adapted to be engaged by a shoulder or flange 25 on the body part 21 of the slide member 12, to limit the downward movement of the slide member 12 in the opening 11. The cylindrical body 21 is held on the pin portion 26 of the slide member 12 by a nut 27.

A solenoid 28 is provided for effecting movement of the slide member 12 in one direction (upward). This solenoid 28 has a shell 29, the lower portion of which threads into the counterbore 23, and the upper portion of which receives a threaded cap member 30 adapted to hold in place a core 31 which projects downwardly within a solenoid winding 32. An armature 33 is contained within the lower portion of the shell 29, with its upper portion projecting into the lower end of the winding 32, and with its upper end face 34 spaced from the lower end face 35 of the core 31 when the solenoid is deenergized. The armature 33 has an axial opening 36 which is enlarged at its lower end to receive the upper end of the pin portion 26 of the slide member 12. A transverse pin 37 connects the lower end of the armature 33 to the upper end of the slide member so that when energization of the solenoid coil 32 causes upward movement of the armature 33, the slide member 12 will be moved upwardly from the position in which it is shown in Figs. 1 and 2 to the position in which it is shown in Fig. 3, opening one of the valves ports and closing the other.

The valve body 10 has in its opening 11, between the pressure passage 13 and the service passage 14, a port member 38 consisting of a rigid annulus of metal integrally formed with the body 10 and having a relatively sharp annular shoulder 39 defining the pressure port 40. In the valve body 10 between the service passage 14 and the vent passage 15 there is a vent port member 41 comprising a resilient O-ring 42, the inner annular portion 43 of which defines the vent port 44 positioned between the passages 14 and 15. The vent port means or member 41 includes means for holding O-ring 42 securely in its operative position, this means comprising inwardly projecting annular ribs or flanges 45 and 46 defining an annular channel in which the O-ring is gripped, with its inner annular portion 34 exposed. The flange 45 is integrally formed in the valve body 10, and the flange 46 is formed on the inner (upper) end 47 of the sleeve 17 which threads into the lower end of a body opening 11.

The flange 45 is tapered radially inwardly to a thin edge or lip 48 which is flanged downwardly to provide a bead 48' to engage the contiguous portion of the O-ring 42. The flange 46 likewise tapers inwardly so as to have a thin edge or lip 49. The flange 46 has a slight inward and upward slope, as shown in Figs. 2 and 3 so that the annular channel 42' formed between the flanges 45 and 46 to receive the O-ring 42 will be narrowest at its mouth whereby the O-ring will be retained securely in operative position between the flanges 45 and 46, with the inner annular portion 43 of the O-ring 42 projecting radially inwardly beyond the lips 48 and 49. The O-ring 42 initially has an internal diameter substantially the same as the diameter of the cylindrical body 16 and its inner annular portion 43 is caused to project inwardly to a smaller diameter as the result of the application of axial compression when the sleeve 17 is screwed up tightly into the position in which it is shown, this axial compression of the O-ring 42 between the flanges 45 and 46 squeezing or deforming the inner annular portion 43 radially inwardly to smaller diameter and radially overlapping relation to an annular closure.

To cooperate with the inner annular portion 43 of the O-ring 42, and to form a closure for the vent port 44, the slide part 12 has thereon a vent closure member 50 having a relatively sharp annular shoulder 51 which is in downwardly spaced relation to the inner annular portion 43 of the O-ring 42 and the lip 49 when the slide member 12 is in lowered position, and which shoulder 51 is moved into engagement with the lower part 43' of the inner annular portion 43, as shown in Fig. 3, when energization of the solenoid 28 moves the slide member 12 upwardly so as to bring the flange 18 into engagement with the stop or shoulder 19' constituting the inner end of the counterbore 19.

To cooperate with the shoulder 39 of the pressure port member 38, and to close the pressure port 40, the slide member 12 has thereon pressure port closure means 52 comprising an O-ring 53 having an outer annular portion 54, the lower portion 54' of which engages the shoulder 39 when the slide member 12 is in lowered position, in which lowered position the slide member 12 is normally held by a compression spring 55 arranged between the lower extremity of the shell 29 and the flange 25 of the body 21 which is fixed on the slide member 12, holding the flange 25 tightly against the stop 24 of the body 10.

The closure means 52 includes an upper shoulder or flange 56 which is formed on the cylindrical body 21, and an annular member comprising a generally radially outwardly extending flange 57 on the pin portion 26 of the slide member 12. The shoulders or flanges 56 and 57 define an annular channel 53' which receives the O-ring 53. The shoulder or flange 56 has at its periphery a downwardly projecting bead 58 to engage the O-ring 53, and the flange 57 tapers upwardly and outwardly to a thin edge or lip 59. In Fig. 4 the O-ring 53 is shown prior to its deformation. When the nut 27 is loosened, the body 21 may be moved into spaced relation to the flange 57, so that axial compression will not be applied to the O-ring 53 by the shoulder 56 and the flange 57. Adjacent the shoulder 56, the cylindrical body 21 has a cylindrical shelf 60 to initially support the O-ring 53 as shown in Fig. 4. In this initial condition the O-ring 53 has an external diameter substantially the same as the external diameter of the shoulders 56 and the lip 59. Therefore, the ring 53 does not project radially outwardly beyond the lip 59, and may be passed through any opening through which the flange 57 will pass. When the nut 27 is tightened, to bring the body 21 into engagement with the flange 57, the O-ring 53 will be axially compressed and will be deformed so that the outer annular portion 54 thereof will project radially beyond the lip 59.

The slide member 12 is substantially pressure balanced within the opening 11 of the body due to the following. The cylindrical bodies 16 and 21, the lip 51 of the bent closure members 50, the lip 59 of the flange 57 and the shoulder 56 are of the same diameter. Likewise, the internal diameter of the shoulder 39, and the internal diameter of the lips 48 and 49 is the same as the diameter of the cylindrical body 16, allowing a very slight differential for example, one-thousandth of an inch, for clearance, so that the lip 59 may move into the pressure port 40 when the slide member 12 is shifted into the position in which it is shown in Fig. 3 to its position in Fig. 2, and so that the shoulder 51 of the vent closure member 50 may pass through the opening defined by the lip 49 when the slide member 12 is pulled upwardly from the position in which it is shown in Figs. 1 and 2 to the position in which it is shown in Fig. 3, at which time the pressure port 40 will be open and the shoulder 51 of the vent closure member 50 will be in engagement with the annular part 43' of the inner portion 43 of the O-ring 42.

In its initial condition shown in Fig. 4, the O-ring 53, mounted upon the cylindrical shoulder 60 of the cylindrical body 22 may be passed downwardly through the sealing ring 22 and through that portion of the bore of the body 10 in which the sealing ring 22 is located. Then, prior to insertion of the body portion 12 and pin portion 26 of the slide member 12, the O-ring 42 is placed in position adjacent the shoulder 45, and the sleeve 17 is inserted in the lower end of the opening, but it is not screwed up to its uppermost position so as to cause the flange 46 to compress the O-ring 42. At this time, therefore, the internal diameter of the O-ring 42 will be substantially the same as the internal diameter of the part 46, and the flange 57 may be moved through the O-ring 42 upwardly into engagement with the O-ring 53, as the upper portion of the pin 26 moves upwardly through the bore of the previously inserted cylindrical body 21. Finally, the tightening of the nut 27 and the screwing of the sleeve 17 upwardly into its operative positions shown in Figs. 1, 2 and 3 will result in the axial compression of the O-rings 53 and 42 in the manner and for the purpose previously described herein. The resilient rings 53 and 42 are respectively arranged upstream from the rigid shoulders with which they cooperate. The ring 53 is upstream from the shoulder 39, so that when the ring 53 is in engagement with the shoulder 39, the major part of the outwardly projecting portion 54 will be exposed to pressure of fluid from the pressure passage 13, this pressure of fluid tending to deform the resilient or rubbery material of the projecting portion 54 toward the shoulder 39, so that as pressure increases in the pressure passage 13 the pressure of engagement between the annular portion 54 and the shoulder 39 will always be sufficient to prevent leakage through the pressure port 40. Also, when the vent port 44 is closed, the shoulder 51 will be in engagement with the lower annular portion 43' of the inwardly projecting portion 43 of the ring 42, leaving a major part of the projecting portion 43 exposed to fluid pressure which acts to maintain the engaged portion of the ring 42 in seal-effecting contact with the shoulder 51.

The arrangement described hereinbefore, including the flange 57 which is tapered outwardly to a thin lip 59, obtains an ample opening of the port 40 with a minimum movement of the closure member 52. When the port 40 is closed, the lip 59 is very close to the shoulder 39. Therefore, the distance through which the lip 59 is required to move upwardly in order to fully open the pressure port 40 is small because of the initial positioning of the lip 59 and likewise its thinness. A similar condition exists with relation to the O-ring 42. The shoulder 51, when the vent port 44 is closed, is only slightly above the lip 49, and therefore, only a relatively small downward movement of the lip 51 is required to bring it downwardly into a position sufficiently below the lip 49 to provide the required opening of the vent port 44.

In the form of the invention shown in Figs. 1, 2 and 3 inclusive, the pressure port of the valve is normally closed and the vent port is normally open so that pressure previously existing in the service port 14 will be bled out through the vent passage 15. Energization of the solenoid 28 will effect upward movement of the slide member 12, closing the vent port 44 and opening the pressure port 40, this condition being maintained so long as the solenoid is energized.

Figures 5, 7:
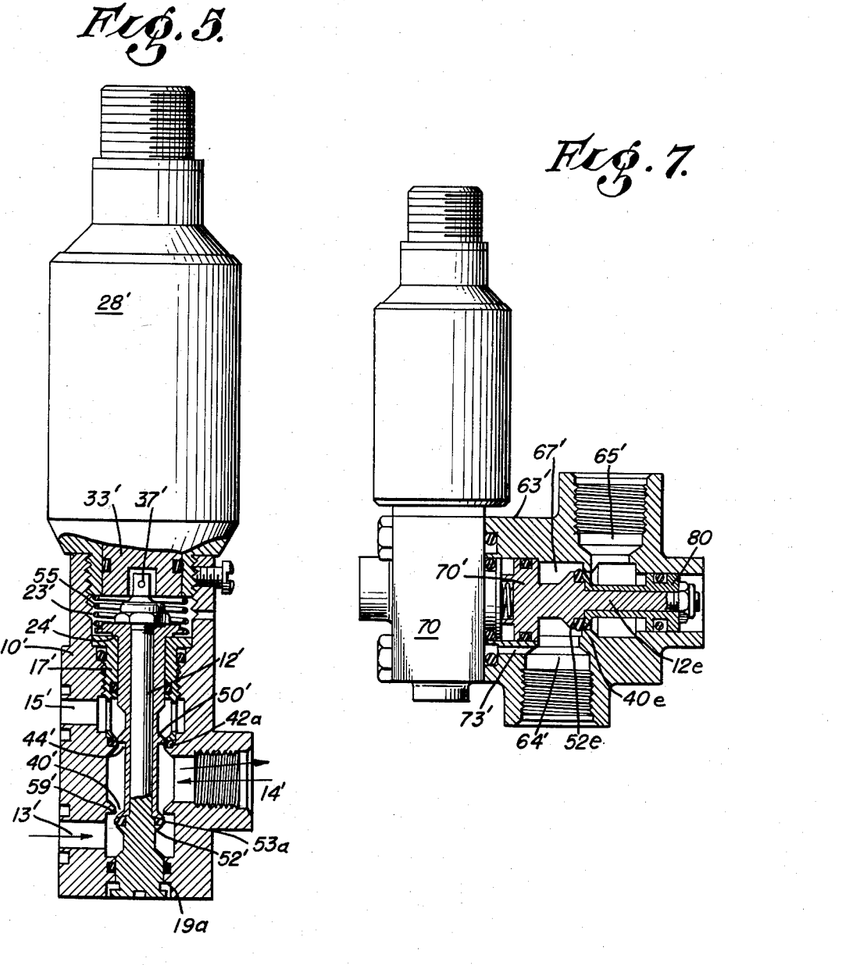
Fig. 5 is a partly sectioned view, similar to Fig. 1, showing a vented valve wherein the pressure port is normally open.
Fig. 7 is a partly sectioned view showing a shut-off valve embodying a part of the invention.

In Fig. 5 we show a form of the invention wherein the pressure port is normally open and the vent port is normally closed when the solenoid of the valve device is to be energized. This is accomplished by reversal of the pressure and vent passages and a similar reversal of the positions of the pressure and vent ports. The pressure or inlet passage 13' of Fig. 5 is disposed below the service passage 14' and the vent passage 15' is placed above the passage 14'. The pressure port 40', positioned between the pressure passage 13' and the service passage 14' is defined by a rigid annular shoulder 59' which is the counterpart of the shoulder 39 of Figs. 2 and 3, except that it is now faced downwardly instead of upwardly to cooperate with a pressure port closure member 52' having as a part thereof a resilient ring or O-ring 53a.

Between the service port 14' and the vent port 15' there is a vent port 44' adapted to be closed by a vent closure member 50' on the slide member 12', this closure 50 being a counterpart of the closure 50 of Figs. 2 and 3 except that it is faced downwardly, but is arranged between the vent passage 15' and a resilient or O-ring 42a which defines the vent port 44' between the service passage 14' and the vent passage 15'. The sleeve 17 of Fig. 1 is transferred to the upper end of the valve body 10' where it appears as sleeve 17' inserted through the counterbore 23'. A solenoid 28' is secured to the upper end of the body 10'. Its construction is the same as that of the solenoid 28 shown in Fig. 1, and its armature 33' is connected to the upper end of the slide member 12' by a transverse pin 37'. A compression spring 55' urges the slide member 12' down against a stop 24', to bring the peripheral shoulder of the vent closure member 50' into engagement with the inner portion of the resilient ring 42a. When the solenoid 28' is energized, the slide member 12' is pulled upwardly from the position in which it is shown in Fig. 5 against a stop 19a, at which time the projecting portion of the resilient ring 53a will be in engagement with the shoulder 59' which defines the pressure port 40', closing this pressure port 40' and opening the vent port 44' so that no more fluid under pressure will flow from the passage 13' to the passage 14', and that fluid pressure which previously existed in the passage 14' will be bled off through the vent passage 15'. The rings 42a and 53a are respectively counterparts of the O-rings 42 and 53, and when in use are subjected to axial compression and deformation as described with relation to the O-rings 42 and 53.

Figure 6:
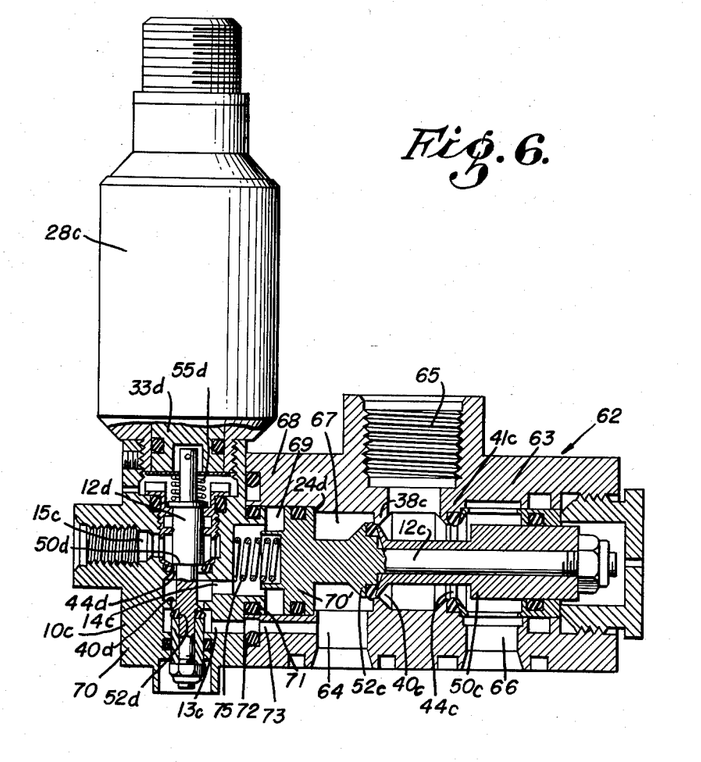
Fig. 6 is a partly sectioned view showing a pilot operated valve according to our invention.

The pilot operated valve 62 of Fig. 6 includes a body 63 having pressure, service and vent passages 64, 65 and 66 communicating with axially spaced parts of an opening 67 which extends within the body 63. The body 63 has therein a pressure port forming member 38c and a vent port forming member 41c which are the counterparts of the port forming members 38 and 42 of Figs. 1 to 3. In the axial opening 67 of the body 63 there is a slide member 12c having thereon a pressure port closure member 52c for cooperation with the pressure port forming member 38c, and also having thereon a vent port closure member 50c to cooperate with the vent port forming member 41c, corresponding to the closure members 52 and 50 of Figs. 2 and 3.

At the leftward end of the body 63 there is a wall 68 forming a cylinder 69 in which a piston 70, connected to the leftward end of the slide member 12c, is operative. The diameter of the piston 70 is greater than the diameter of the closure member 52c.

The piston 70 is operated back and forth in the cylinder 69 by differential pressure applied to the opposite faces thereof. Fluid pressure applied to the leftward face of the piston 70, tends to hold the slide part 12c in a position to close the pressure port 40c of the valve body 63, but when this fluid pressure is released from the leftward face of the piston 70, fluid pressure applied to the rightward face of the piston 70 through the pressure passage 64 will shift the piston 70 leftwardly from the position in which it is shown in Fig. 6, opening the pressure port 40c and moving the vent closure member 50c leftwardly so as to close the vent port 44c.

Control of the differential of pressure applied to the piston 70 is accomplished through use of a solenoid operated valve such as shown in Fig. 5, having its pressure port normally open. The solenoid operated valve 70 of Fig. 6 is bolted onto the leftward end of the valve body 63, and O-rings 71 and 72 are placed so as to provide a seal between the valve body 63 and the body 10c of the valve 70. The valve body 70 has a pressure passage 13c which communicates with the pressure passage 64 of the valve body 63 through a passage 73. The valve body 10c has a service passage 14c which communicates with the leftward end of the cylinder 69. The valve body 10c has a pressure port 40d between the passages 13c and 14c, and also a vent port 44d between the service passage 14c and a vent passage 15c. The valve 70 has a slide member 12d which normally rests in lowered position as shown in Fig. 6, at which time a vent port closure member 50d, on the slide member 12d, closes the vent port 44d, and a pressure port closure member 52d on the slide 12d is disposed in open relation to the pressure port 40d so that fluid pressure from the pressure passage 64 may pass through the port 40d to the leftward face of the piston 70, holding the same against a stop 24d, to maintain the closure member 52c in closed relation to the port 40c. The valve 70 includes a solenoid 28c which is secured to the upper end of the valve body 10c. Upon energization of this solenoid 28c, its armature 33d will be attracted upwardly raising the slide member 12d against the force of a spring 55d, closing the pressure port 40d and opening the vent port 44d to vent the fluid pressure from the leftward portion of the cylinder 69 whereupon fluid pressure acting through the passage 64 against the rightward face of the piston 70 will effect a leftward movement of the slide member 12c to open the pressure port 40c and to close the vent port 44c. A spring 75 is arranged to continuously exert a pressure against the slide member 12c to urge the same rightwardly so that the closure member 52c will close the pressure port 40c when there is no fluid pressure in the passage 64 capable of actuating the piston 70.

A modification of the pilot operated valve of Fig. 6 is shown in Fig. 7. The valve device shown in Fig. 7 corresponds to that of Fig. 6 in all respects except that it eliminates the vent port 44c and the vent passage 66 of the device shown in Fig. 6. It has a body 63' with an inlet or pressure passage 64' and an outlet or service passage 65'. The valve body 63 has an axial opening 67' and a pressure port forming member or shoulder 40e adapted to be closed by a closure member 52e on a slide member 12e which is arranged within the opening 67'. The pilot valve 70 of Fig. 6 is bolted onto the leftward end of the valve body 63' which has therein a pressure passage 73' corresponding to the passage 73 of Fig. 6, to supply fluid under pressure to the pilot valve 70 which will in turn control the application of fluid pressure against the leftward face of the piston 70' which is connected to the leftward end of the slide member 12e. This form of the invention is adapted for controlling the supply of fluid to a device adapted to utilize the same. For example, the passages 64' and 65' may be connected into a fuel line leading from a fuel tank to a jet engine in an aircraft or the fuel chamber of a rocket-propelled missile. The slide member 12e is balanced against being opened by the return of pressure through the outlet passage 65'. The slide member 12e has on its rightward end a cylindrical body or piston 80 of the same diameter as the valve closure member 52e, to balance any pressure which may be applied leftwardly against the closure member 52e from the passage 65'.

We claim:

1. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being initially approximately the same as the diameter of the port defined by said annular shoulder, and an annular member on said slide member for axially compressing said resilient ring so as to expand its outer portion to a diameter slightly larger than the diameter of the port opening of said pressure port means, said annular member comprising a generally radially outwardly extending flange which tapers to a thin edge at its periphery, said flange being disposed between said ring and said service passage; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter initially substantially the same as the shoulder of said second closure means, and means for supporting and axially compressing said resilient ring of said vent port means so as to reduce its internal diameter to a value smaller than the diameter of said annular shoulder of said second closure means, said supporting means comprising a generally radially inwardly extending flange which tapers to a thin edge, said flange being disposed between said ring and said vent passage; and stop means between said body and said slide member to stop said slide member when said annular shoulder of said second closure means is in position of initial engagement with said resilient ring of said vent port means.

2. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being initially approximately the same as the diameter of the port defined by said annular shoulder, and an annular member on said slide member for axially compressing said resilient ring so as to expand its outer portion to a diameter slightly larger than the diameter of the port opening of said pressure port means; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter initially substantially the same as the shoulder of said second closure means, and means for supporting and axially compressing said resilient ring of said vent port means so as to reduce its internal diameter to a value smaller than the diameter of said annular shoulder of said second closure means; and stop means between said body and said slide member to stop said slide member when said annular shoulder of said second closure means is in position of initial engagement with said resilient ring of said vent port means.

3. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being initially approximately the same as the diameter of the port defined by said annular shoulder, and an annular member on said slide member for axially compressing said resilient ring so as to expand its outer portion to a diameter slightly larger than the diameter of the port opening of said pressure port means, said annular member comprising a generally radially outwardly extending flange which tapers to a thin edge at its periphery, said flange being disposed between said ring and said service passage; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter slightly less than the external diameter of said second closure means, and means for supporting said resilient ring of said vent port means, said supporting means comprising a generally radially inwardly extending flange which tapers to a thin edge, said flange being disposed between said ring and said vent passage; and stop means between said body and said slide member to stop said slide member when said annular shoulder of said second closure means is in position of initial engagement with said resilient ring of said vent port means.

4. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being initially approximately the same as the diameter of the port defined by said annular shoulder, and an annular member on said slide member for axially compressing said resilient ring so as to expand its outer portion to a diameter slightly larger than the diameter of the port opening of said pressure port means, said annular member comprising a generally radially outwardly extending flange which tapers to a thin edge at its periphery, said flange being disposed between said ring and said service passage; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter slightly less than the external diameter of said second closure means, and means for supporting said resilient ring of said vent port means; and stop means between said body and said slide member to stop said slide member when said annular shoulder of said second closure means is in position of initial engagement with said resilient ring of said vent port means.

5. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being slightly larger than the diameter of the port opening of said pressure port means and an annular member on said slide member for supporting said resilient ring, said annular member comprising a generally radially outwardly extending flange which tapers to a thin edge at its periphery, said flange being disposed between said ring and said service passage; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter slightly less than the external diameter of said second closure means, and means for supporting said resilient ring of said vent port means, said supporting means comprising a generally radially inwardly extending flange which tapers to a thin edge, said flange being disposed between said ring and said vent passage; and stop means between said body and said slide member to stop said slide member when said annular shoulder of said second closure means is in position of initial engagement with said resilient ring of said vent port means.

6. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being slightly larger than the diameter of the port opening of said pressure port means; stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter initially substantially the same as the shoulder of said second closure means, and means for supporting and axially compressing said resilient ring of said vent port means so as to reduce its internal diameter to a value smaller than the diameter of said annular shoulder of said second closure means, said supporting means comprising a generally inwardly extending flange which tapers to a thin edge, said flange being disposed between said ring and said vent passage; and stop means between said body and said slide member to stop said slide member when said annular shoulder of said second closure means is in position of initial engagement with said resilient ring of said vent port means.

7. In a valve device: a body having an axial opening and axially spaced pressure, service and vent passages connected to said axial opening, said service passage being between said pressure and vent passages; a slide member in said axial opening; pressure port means in said axial opening between said pressure and service passages comprising an annular shoulder; closure means on said slide member comprising a resilient ring disposed between said annular shoulder and said pressure passage, the outer diameter of said ring being initially approximately the same as the diameter of the port defined by said annular shoulder, and an annular member on said slide member for axially compressing said resilient ring so as to expand its outer portion to a diameter slightly larger than the diameter of the port opening of said pressure port means, said annular member comprising a generally radially outwardly extending flange which tapers to a thin edge at its periphery, said flange being disposed between said ring and said service passage; first stop means between said body and said slide member to stop said slide member when said resilient ring is in position of initial engagement with said annular shoulder of said pressure port means; a second closure means on said slide member between said service passage and said vent passage comprising an annular shoulder; vent port means in said axial opening between said service passage and said vent passage comprising a resilient ring having an internal diameter initially substantially the same as the shoulder of said second closure means, and means for supporting and axially compressing said resilient ring of said vent port means so as to reduce its internal diameter to a value smaller than the diameter of said annular shoulder of said second closure means, said supporting means comprising a generally radially inwardly extending flange which tapers to a thin edge, said flange being disposed between said ring and said vent passage; second stop means between said body and said slide member to stop said slide member when said annular shoulder of said second closure means is in position of initial engagement with said resilient ring of said vent port means; said first and second stop means being spaced so that the axial movement of said slide member will not be substantially greater than one-sixth the diameter of said pressure port means; and electrically operated means at an end of said body for effecting axial movement of said slide member.

8. In a valve: a body having an inlet passage and an outlet passage communicating with said inlet passage; annular port forming means in said body between said inlet passage and said outlet passage, said port forming means having an annular valve seat; a slide member having closure means for closing said port, said closure means comprising an annular resilient ring and annular radially outwardly extending walls disposed axially on opposite sides of said ring, one of said walls comprising a generally radially outwardly extending flange which tapers to a thin annular lip at its periphery, at least one of said walls being axially movable toward the other so as to squeeze said ring therebetween and cause an outer annular portion of said ring to project radially outwardly directly adjacent said thin lip into overlapping relation with respect to said valve seat, said thin lip being disposed between said ring and said outlet passage, the outer diameter of said thin lip being less than the inner diameter of said valve seat, said thin lip being disposed adjacent to said annular valve seat and within said port when said slide member is in port closing position, said ring being disposed between said valve seat and said inlet passage; means for moving said slide member axially into port closing position wherein the portion of said ring which projects from said thin lip overlies and makes initial sealing engagement with said valve seat; stop means independent from said ring and valve seat for preventing movement of said slide member beyond said position so that only the projecting portion of said ring will be moved beyond its initial position of engagement with said valve seat in response to fluid pressure in said inlet passage; means for moving said slide member axially to port opening position, said slide member moving said resilient ring away from said valve seat and said thin lip out of said port to open said port by a small axial movement of said slide member in a port opening direction, the portion of said flange which is disposed toward said outlet passage receding inwardly away from said thin lip so that said flange does not substantially obstruct fluid passage through said port upon movement of said slide member in a port opening direction, the opening between said port and port closure means being large in proportion to the distance of axial movement of said slide member.

9. In a valve: a body having an inlet passage and an outlet passage communicating with said inlet passage; annular port forming means in said body between said inlet passage and said outlet passage, said port forming means having an annular valve seat; a slide member having closure means for closing said port, said closure means comprising an annular resilient ring and annular radially outwardly extending walls disposed axially on opposite sides of said ring, one of said walls comprising a generally radially outwardly extending flange which tapers to a thin annular lip at its periphery, at least one of said walls being axially movable toward the other so as to squeeze said ring therebetween and cause an outer annular portion of said ring to project radially outwardly directly adjacent said thin lip into overlapping relation with respect to said valve seat, said thin lip being disposed between said ring and said outlet passage, the outer diameter of said thin lip being less than the inner diameter of said valve seat, said thin lip being disposed adjacent to said annular valve seat and within said port when said slide member is in port closing position, said ring being disposed between said valve seat and said inlet passage; means for moving said slide member axially into port closing position wherein the portion of said ring which projects from said thin lip overlies and makes initial sealing engagement with said valve seat, the projecting portion of said ring being movable beyond its initial position of engagement with said valve seat in response to fluid pressure in said inlet passage; means for moving said slide member axially to port opening position, said slide member moving said resilient ring away from said valve seat and said thin lip out of said port to open said port by a small axial movement of said slide member in a port opening direction, the portion of said flange which is disposed toward said outlet passage receding inwardly away from said thin lip so that said flange does not substantially obstruct fluid passage through said port upon movement of said slide member in a port opening direction, the opening between said port and port closure means being large in proportion to the distance of axial movement of said slide member.

10. In a valve: a body having an inlet passage and an outlet passage communicating with said inlet passage; annular port forming means in said body between said inlet passage and said outlet passage, said port forming means comprising an annular resilient ring and annular radially inwardly extending walls disposed axially on opposite sides of said ring, one of said walls comprising a generally radially inwardly extending flange which tapers to a thin annular lip at its periphery, at least one of said walls being axially movable toward the other so as to squeeze said ring therebetween and cause an inner annular portion of said ring to project radially inwardly directly adjacent to said thin lip, said flange being disposed between said ring and said outlet passage; a slide member having closure means for closing said port, said closure means comprising an annular shoulder, the outer diameter of said shoulder being less than the inner diameter of said thin lip, said shoulder being disposed adjacent to said thin lip and within said port when said slide member is in port closing position, said ring being disposed between said shoulder and said inlet passage, the inner annular portion of said ring projecting radially inwardly from said thin lip into overlapping relation to said shoulder when said slide member is disposed in port closing position; means for moving said slide member axially into port closing position wherein the portion of said ring which projects from said thin lip overlies and makes initial sealing engagement with said shoulder; stop means independent from said ring and shoulder for preventing movement of said slide member beyond said position so that only the projecting portion of said ring will be moved beyond its initial position of engagement with said shoulder in response to fluid pressure in said inlet passage; means for moving said slide member axially to port opening position, said slide member moving said shoulder away from said ring and out of said port to open said port by a small axial movement of said slide member in a port opening direction, the portion of said flange which is disposed toward said outlet passage receding outwardly away from said thin lip so that said flange does not substantially obstruct fluid passage through said port upon movement of said slide member in a port opening direction, the opening between said port and port closure means being large in proportion to the distance of axial movement of said slide member.

11. In a valve: a body having an inlet passage and an outlet passage communicating with said inlet passage; annular port forming means in said body between said inlet passage and said outlet passage, said port forming means comprising an annular resilient ring and annular radially inwardly extending walls disposed axially on opposite sides of said ring, one of said walls comprising a generally radially inwardly extending flange which tapers to a thin annular lip at its periphery, at least one of said walls being axially movable toward the other so as to squeeze said ring therebetween and cause an inner annular portion of said ring to project radially inwardly directly adjacent to said thin lip, said flange being disposed between said ring and said outlet passage; a slide member having closure means for closing said port, said closure means comprising an annular shoulder, the outer diameter of said shoulder being less than the inner diameter of said thin lip, said shoulder being disposed adjacent to said thin lip and within said port when said slide member is in port closing position, said ring being disposed between said shoulder and said inlet passage, the inner annular portion of said ring projecting radially inwardly from said thin lip into overlapping relation to said shoulder when said slide member is disposed in port closing position; means for moving said slide member axially into port closing position wherein the portion of said ring which projects from said thin lip overlies and makes initial sealing engagement with said shoulder, the projecting portion of said ring being movable beyond its initial position of engagement with said shoulder in response to fluid pressure in said inlet passage; means for moving said slide member axially to port opening position, said slide member moving said shoulder away from said ring and out of said port to open said port by a small axial movement of said slide member in a port opening direction, the portion of said flange which is disposed toward said outlet passage receding outwardly away from said thin lip so that said flange does not substantially obstruct fluid passage through said port upon movement of said slide member in a port opening direction, the opening between said port and port closure means being large in proportion to the distance of axial movement of said slide member.

12. In a valve: a body having an inlet passage, an outlet passage and a vent passage; a port between said inlet passage and said outlet passage and a port between said outlet passage and said vent passage, one of said ports having an annular valve seat; a slide member having closure means for closing said port, said closure means comprising an annular resilient ring and an annular supporting flange for said ring, said flange being disposed downstream from said ring, said supporting flange having a thin peripheral lip, the portion of said flange which is disposed toward said valve seat receding inwardly away from said thin lip so that said flange does not substantially obstruct fluid passage through said port upon movement of said slide member in a port opening direction, the outer diameter of said thin lip being less than the inner diameter of said valve seat, said thin lip being disposed adjacent to said valve seat and within said port when said slide member is in a position closing said port, said ring being disposed upstream from said valve seat, said ring having an outer annular portion projecting radially outwardly directly adjacent to said thin lip into overlapping relation to said valve seat when said slide member is disposed in a position closing said port; means for moving said slide member axially into a position closing said port wherein the portion of said ring which projects from said thin lip overlies and makes initial sealing engagement with said valve seat; stop means independent from said ring and valve seat for preventing movement of said slide member beyond said position so that only the projecting portion of said ring will be moved beyond its initial position of engagement with said valve seat in response to fluid pressure; the other of said ports comprising an annular resilient ring and an annular supporting flange for said ring, said flange being disposed downstream from said ring; said slide member having closure means for closing said port, said closure means comprising an annular shoulder, said ring being disposed upstream from said shoulder; said supporting flange having a thin peripheral lip, the outer diameter of said shoulder being less than the inner diameter of said thin lip, said shoulder being disposed adjacent to said thin lip and within said port when said slide member is in a position closing said port, the portion of said flange which is disposed toward said shoulder receding outwardly away from said thin lip so that said flange does not substantially obstruct fluid passage through said port upon movement of said slide member in a direction opening said port; said ring having an inner annular portion projecting radially inwardly directly adjacent to said thin lip into overlapping relation to said shoulder when said slide member is disposed in a position closing said port; means for moving said slide member axially into a position closing said port wherein said projecting portion of said ring overlies and makes initial sealing engagement with said shoulder; stop means independent from said ring and shoulder for preventing movement of said slide member beyond said position so that only the projecting portion of said ring will be moved beyond its initial position of engagement with said shoulder in response to fluid pressure; said slide member being movable axially to a position opening either of said ports, said slide member moving the port closure means out of said port to open said port by a small axial movement of said slide member in a port opening direction, the opening between the port and respective port closure means of said port being large in proportion to the distance of axial movement of said slide member.

13. In a valve: a body having an inlet passage, an outlet passage and a vent passage; a port between said inlet passage and said outlet passage and a port between said outlet passage and said vent passage, one of said ports having an annular valve seat; a slide member having closure means for closing said port, said closure means comprising an annular resilient ring and an annular supporting flange for said ring, said flange being disposed downstream from said ring, said flange having a thin peripheral lip, the portion of said flange which is disposed toward said valve seat receding inwardly away from said thin lip so that said flange does not substantially obstruct fluid passage through said port upon movement of said slide member in a port opening direction, the outer diameter of said thin lip being less than the inner diameter of said valve seat, said thin lip being disposed adjacent to said valve seat and within said port when said slide member is in a position closing said port, said ring being disposed upstream from said valve seat, said ring having an outer annular portion projecting radially outwardly directly adjacent to said thin lip into overlapping relation to said valve seat when said slide member is disposed in a position closing said port; means for moving said slide member axially into a position closing said port wherein said projecting portion of said ring overlies and makes initial sealing engagement with said valve seat, said projecting portion of said ring being movable beyond its initial position of engagement with said valve seat in response to fluid pressure; the other of said ports comprising an annular resilient ring and an annular supporting flange for said ring, said flange being disposed downstream from said ring; said slide member having closure means for closing said port, said closure means comprising an annular shoulder, said ring being disposed upstream from said shoulder; said supporting flange having a thin peripheral lip, the outer diameter of said shoulder being less than the inner diameter of said thin lip, said shoulder being disposed adjacent to said thin lip and within said port when said slide member is in a position closing said port, the portion of said flange which is disposed toward said shoulder receding outwardly away from said thin lip so that said flange does not substantially obstruct fluid passage through said port upon movement of said slide member in a direction opening said port; said ring having an inner annular portion projecting radially inwardly directly adjacent to said thin lip into overlapping relation to said shoulder when said slide member is disposed in a position closing said port; means for moving said slide member axially into a position closing said port wherein said projecting portion of said ring overlies and makes initial sealing engagement with said shoulder, said projecting portion being movable beyond its initial position of engagement with said shoulder in response to fluid pressure; said slide member being movable axially to a position opening either of said ports, said slide member moving the port closure means out of said port to open said port by a small axial movement of said slide member in a port opening direction, the opening between the port and respective port closure means of said port being large in proportion to the distance of axial movement of said slide member.

14. In a valve: a body having an inlet passage, an outlet passage and a vent passage; a port between said inlet passage and said outlet passage and a port between said outlet passage and said vent passage, one of said ports having an annular valve seat; a slide member having closure means for closing said port, said closure means comprising an annular resilient ring and an annular supporting flange for said ring, said flange being disposed downstream from said ring, said supporting flange having a thin peripheral lip, the portion of said flange which is disposed toward said valve seat receding inwardly away from said thin lip so that said flange does not substantially obstruct fluid passage through said port upon movement of said slide member in a port opening direction, the outer diameter of said thin lip being less than the inner diameter of said valve seat, said thin lip being disposed adjacent to said valve seat and within said port when said slide member is in a position closing said port, said ring being disposed upstream from said valve seat, said ring having an outer annular portion projecting radially outwardly directly adjacent to said thin lip into overlapping relation to said valve seat when said slide member is disposed in a position closing said port; the projecting portion of said ring being movable beyond its initial position of engagement with said valve seat in response to fluid pressure; the other of said ports comprising an annular resilient ring and an annular supporting flange for said ring, said flange being disposed downstream from said ring; said slide member having closure means for closing said port, said closure means comprising an annular shoulder, said ring being disposed upstream from said shoulder; said supporting flange having a thin peripheral lip, the outer diameter of said shoulder being less than the inner diameter of said thin lip, said shoulder being disposed adjacent to said thin lip and within said port when said slide member is in a position closing said port, the portion of said flange which is disposed toward said shoulder receding outwardly away from said thin lip so that said flange does not substantially obstruct fluid passage through said port upon movement of said slide member in a direction opening said port; said ring having an inner annular portion projecting radially inwardly directly adjacent to said thin lip into overlapping relation to said shoulder when said slide member is disposed in a position closing said port, the projecting portion of said ring being movable beyond its initial position of engagement with said shoulder in response to fluid pressure; actuating means for effecting axial movement of said slide member to close one of said ports by moving the port closure means of said port into engagement with said port; stop means independent from the port closure means of said port for preventing movement of said slide member by said actuating means beyond said position; means for effecting axial movement of said slide member to close the other of said ports, said slide member being movable axially to a position opening either of said ports, said slide member moving the port closure means out of said port to open said port by a small axial movement of said slide member in a port opening direction, the opening between the port and respective port closure means of said port being large in proportion to the distance of axial movement of said slide member.

15. The structure described in claim 12, each of said rings being held between a wall formed by its supporting flange and a second annular radially extending wall disposed axially on the opposite side of said ring, at least one of said walls being axially movable toward the other so as to squeeze said ring therebetween and cause said annular portion of said ring to project radially directly adjacent to the thin lip of its supporting flange.

16. The structure described in claim 13, each of said rings being held between a wall formed by its supporting flange and a second annular radially extending wall disposed axially on the opposite side of said ring, at least one of said walls being axially movable toward the other so as to squeeze said ring therebetween and cause said annular portion of said ring to project radially directly adjacent to the thin lip of its supporting flange.

17. The structure described in claim 14, each of said rings being held between a wall formed by its supporting flange and a second annular radially extending wall disposed axially on the opposite side of said ring, at least one of said walls being axially movable toward the other so as to squeeze said ring therebetween and cause said annular portion of said ring to project radially directly adjacent to the thin lip of its supporting flange.

References Cited in the file of this patent

UNITED STATES PATENTS

| | | |
|---|---|---|
| 1,313,554 | Nielsen | Aug. 19, 1919 |
| 2,524,142 | Seeloff | Oct. 3, 1950 |
| 2,624,542 | Ghormley | Jan. 6, 1953 |
| 2,660,834 | MacGlashan | Dec. 1, 1953 |
| 2,661,762 | Bryant | Dec. 8, 1953 |
| 2,704,650 | Rand | Mar. 22, 1955 |
| 2,723,681 | MacGlashan | Nov. 15, 1955 |

FOREIGN PATENTS

| | | |
|---|---|---|
| 532,590 | Germany | Aug. 31, 1931 |